(12) United States Patent
Min et al.

(10) Patent No.: US 9,547,340 B2
(45) Date of Patent: Jan. 17, 2017

(54) PORTABLE TERMINAL HAVING FLEXIBLE DISPLAY

(71) Applicant: Samsung Display Co., Ltd., Yongin (KR)

(72) Inventors: Gui-Nam Min, Hwaseong-si (KR); Sang Wol Lee, Yongin-si (KR); Kyu Young Kim, Suwon-si (KR); Ahyoung Kim, Gunpo-si (KR); SeungWook Nam, Cheonan-si (KR); Kyu-taek Lee, Cheonan-si (KR); Yong Cheol Jeong, Yongin-si (KR); Soyeon Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 175 days.

(21) Appl. No.: 14/449,237

(22) Filed: Aug. 1, 2014

(65) Prior Publication Data
US 2015/0192962 A1    Jul. 9, 2015

(30) Foreign Application Priority Data

Jan. 6, 2014  (KR) .................. 10-2014-0001307

(51) Int. Cl.
*G06F 1/16* (2006.01)
*G09G 5/00* (2006.01)
*G09G 3/20* (2006.01)

(52) U.S. Cl.
CPC ............ *G06F 1/1652* (2013.01); *G06F 1/162* (2013.01); *G06F 1/1616* (2013.01); *G06F 1/1677* (2013.01); *G06F 1/1681* (2013.01); *G09G 3/2092* (2013.01); *G09G 5/003* (2013.01); *G06F 1/1622* (2013.01); *G09G 2320/08* (2013.01);

(Continued)

(58) Field of Classification Search
CPC .... G06F 1/1616; G06F 1/1622; G06F 1/1652; G06F 1/1679; G06F 1/1615; G06F 1/1681
See application file for complete search history.

(56) References Cited

U.S. PATENT DOCUMENTS 7,714,801 B2  5/2010  Kimmel
8,229,522 B2  7/2012  Kim et al.
(Continued)

FOREIGN PATENT DOCUMENTS

KR  1020040095406  11/2004
KR     100842515   7/2008

*Primary Examiner* — Kent Chang
*Assistant Examiner* — Sujit Shah
(74) *Attorney, Agent, or Firm* — H.C. Park & Associates, PLC (57) ABSTRACT

A portable terminal, including a first housing including opposing first and second sides, a second housing including opposing first and second sides, a hinge connecting the first sides of the first and second housings, a flexible display including a first end disposed in the second side the first housing, a second end disposed in the second side of the second housing, and a driver configured to drive the display, wherein the first housing and the second housing are configured to rotate on the hinge to form an angle in therebetween such that a corresponding portion of the display is exposed, and the driver is configured to output driving signals corresponding to the angle to the flexible display, such an image is displayed on the exposed portion of the flexible display.

12 Claims, 10 Drawing Sheets

(52) U.S. Cl.
CPC .. *G09G 2340/0407* (2013.01); *G09G 2380/02* (2013.01)

(56) References Cited

U.S. PATENT DOCUMENTS

| | | | |
|---|---|---|---|
| 8,493,726 B2 | 7/2013 | Visser et al. | |
| 2002/0135495 A1* | 9/2002 | Lei | H04B 3/54 340/870.11 |
| 2005/0041012 A1* | 2/2005 | Daniel | G06F 1/1601 345/156 |
| 2008/0167095 A1* | 7/2008 | Kim | H04M 1/0268 455/575.3 |
| 2010/0321255 A1* | 12/2010 | Kough | H01Q 1/2266 343/702 |
| 2011/0227821 A1 | 9/2011 | Silverbrook | |
| 2011/0249042 A1* | 10/2011 | Yamamoto | G09G 3/342 345/690 |
| 2012/0287502 A1 | 11/2012 | Hajjar | |
| 2013/0279088 A1* | 10/2013 | Raff | G06F 1/1637 361/679.01 |
| 2013/0335311 A1* | 12/2013 | Kim | G06F 3/01 345/156 |
| 2014/0055375 A1* | 2/2014 | Kim | G06F 1/1652 345/173 |

* cited by examiner

PORTABLE TERMINAL HAVING FLEXIBLE DISPLAY

CROSS-REFERENCE TO RELATED APPLICATION

This application claims priority from and the benefit of Korean Patent Application No. 10-2014-0001307, filed on Jan. 6, 2014, which is hereby incorporated by reference for all purposes as if fully set forth herein.

BACKGROUND

1. Field

The present disclosure relates to a portable terminal. More particularly, the present disclosure relates to a portable terminal being folded in various ways to display various sized images.

2. Description of the Background

In general, a portable terminal, such as a smart phone, a tablet personal computer, etc., includes a display panel to display an image and provide a user with image information. The display panel may be one of various types of display panel, such as a liquid crystal display panel, an organic light emitting display panel, an electrowetting display panel, an electrophoretic display panel, etc.

The display panel includes a plurality of pixels to display the image. The pixels receive data signals in response to gate signals (or scan signals) and display gray scales corresponding to the data signals, thereby displaying a desired image.

In recent years, a flexible display panel has been developed. The flexible display panel includes a substrate formed of a flexible plastic material.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present disclosure provide a portable terminal that may be folded in various angles to display images of various sizes.

Additional features of the invention will be set forth in the description which follows, and in part will be apparent from the description, or may be learned by practice of the invention.

An embodiment of the inventive concept provides a portable terminal, including a first housing including opposing first and second sides, a second housing including opposing first and second sides, a hinge connecting the first sides of the first and second housings, a flexible display including a first end disposed in the second side the first housing, a second end disposed in the second side of the second housing, and a driver configured to drive the display, wherein the first housing and the second housing are configured to rotate on the hinge to form an angle in therebetween such that a corresponding portion of the display is exposed, and the driver is configured to output driving signals corresponding to the angle to the flexible display, such an image is displayed on the exposed portion of the flexible display.

According to the above, the portable terminal is folded in various angles, and thus the portable terminal displays various sized images.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other advantages of the present disclosure will become readily apparent by reference to the following detailed description when considered in conjunction with the accompanying drawings.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
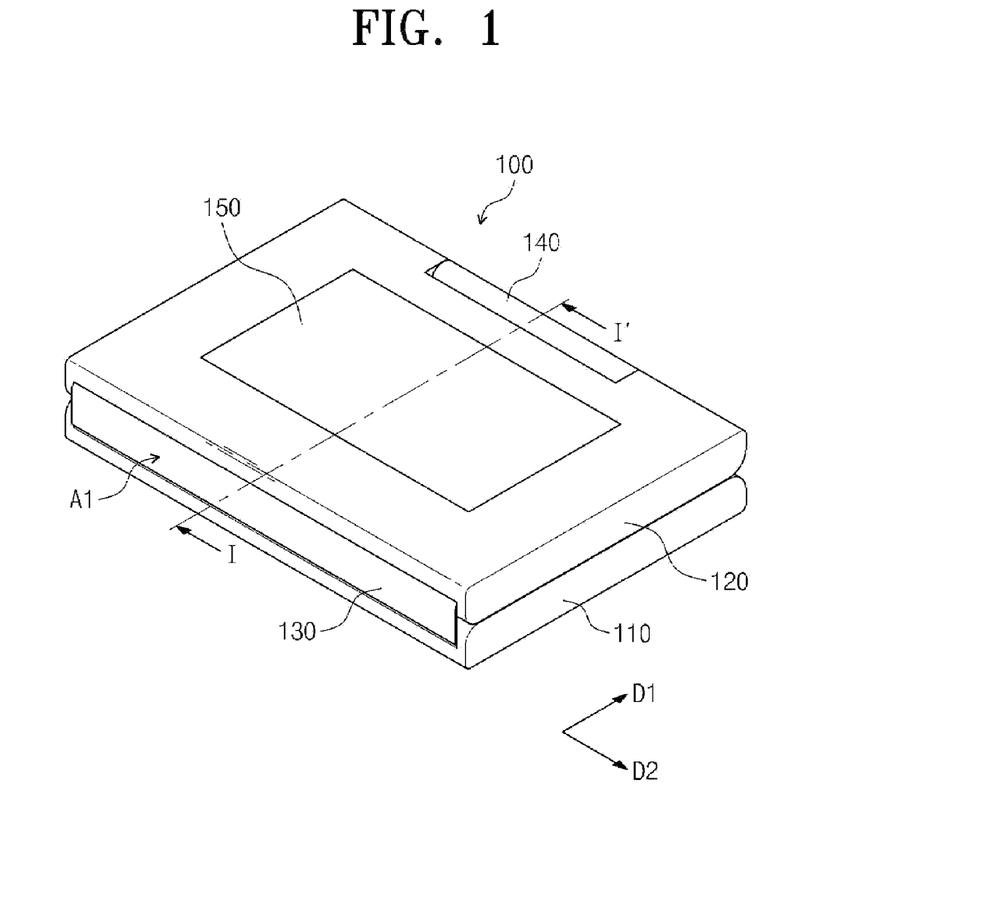
FIG. 1 is a perspective view showing a portable terminal according to an exemplary embodiment of the present disclosure.

FIG. 1 is a perspective view showing a portable terminal according to an exemplary embodiment of the present disclosure.

Referring to FIG. 1, a portable terminal 100 includes a first housing 110 and an opposing second housing 120, a flexible display 130, a hinge 140, and a support member 150.

A surface of the second housing 120 facing the first housing 110 contacts a corresponding surface of the first housing 110. The first and second housings 110 and 120 serve as outer covers of the portable terminal 100. The first and second housings 110 and 120 have short sides extending in a first direction D1 and long sides extending in a second direction D2.

The flexible display 130 is disposed at a first side of the portable terminal 100. The flexible display 130 may be retracted into the first and second housings 110 and 120 through first sides of the first and second housings 110 and 120, or may be extended through the first sides of the first and second housings 110 and 120.

When the first housing 110 makes contact with the second housing 120, a center portion of the flexible display 130 is exposed on the first side of the portable terminal 100. The center portion of the flexible display 130 is referred to as a first area A1.

The flexible display 130 may be, but not limited to, a flexible display panel. The flexible display 130 includes a substrate formed of a flexible plastic material. The flexible display 130 may be rolled or folded.

The flexible display 130 may be a flexible liquid crystal display panel or a flexible organic light emitting display panel. The flexible display 130 includes a plurality of pixels to display an image.

The hinge 140 is disposed at a second side of the portable terminal 100. The first and second housings 110 and 120 are connected to each other by the hinge 140 and may be rotated with respect to the axis of the hinge 140. The portable terminal 100 may be folded or unfolded at the hinge 140. That is, the first and second housings 110 and 120 may be rotated with respect to the axis of the hinge 140, and thus the first and second housings 110 and 120 may be folded or unfolded.

When the first and second housings 110 and 120 are unfolded at an angle at the hinge 140, the flexible display 130 is presented through the first side of the first and second housings 110 and 120 and exposed from the portable terminal 100. The area of the flexible display 130 exposed to the outside may have a size corresponding to the angle between the first and second housings 110 and 120. An image is displayed in the exposed area of the flexible display 130.

The support member 150 is disposed on the second housing 120. The support member 150 may be disposed in a recess on the upper surface of the second housing 120.

Figure 2:
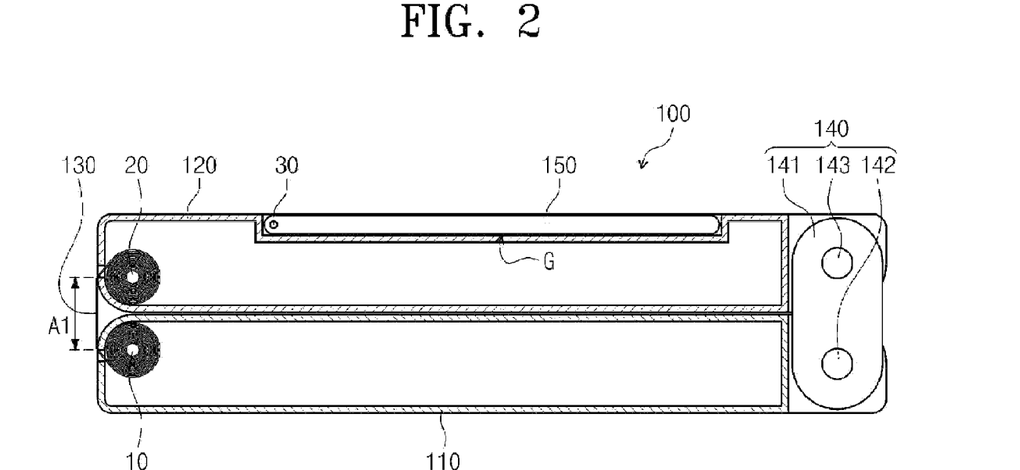
FIG. 2 is a cross-sectional view taken along a line I-I' shown in FIG. 1.

FIG. 2 is a cross-sectional view taken along a line I-I' shown in FIG. 1.

Referring to FIG. 2, a first driving axle 10 is disposed at the first side inside the first housing 110 and a second driving axle 20 is disposed at the first side inside the second housing 120. An area of the flexible display 130 other than the first area A1 may be connected to and rolled around the first and second driving axles 10 and 20.

In detail, an area of the flexible display 130 disposed at one side of the first area A1, is connected to and rolled around the first driving axle 10, and another area of the flexible disposed at the other side of the first area A1, is connected to and rolled around the second driving axle 20.

The first and second driving axles 10 and 20 may rotate to wind or unwind the flexible display 130. Accordingly, the areas disposed at both sides of the first area A1 of the flexible display 130 may be retracted into, or be presented from, the first and second housings 110 and 120 by the rotation of the first and second driving axles 10 and 20.

The hinge 140 includes a hinge body 141, a first hinge axle 142, and a second hinge axle 143. The first and second hinge axles 142 and 143 are disposed on the hinge body 141.

The first hinge axle 142 is disposed at the second side of the first housing 110 and connected to the first housing 110. The second hinge axle 143 is disposed at the second side of the second housing 120 and connected to the second housing 120. Although not shown in figures, the first and second hinge axles 142 and 143 extend in the second direction D2 and are substantially parallel to each other.

The first housing 110 may rotate on the first hinge axle 142, and the second housing 120 may rotate on the second hinge axle 143. Therefore, the first and second housings 110 and 120 may respectively rotate on the first and second hinge axles 142 and 143 when folded or unfolded. Thus, the portable terminal 100 may operate in a folded or unfolded mode.

The first and second housings 110 and 120 may be folded by respectively rotating on the first and second hinge axles 142 and 143, so as to contact each other. In this case, the first area A1 of the flexible display 130 may be exposed on the first side of the first and second housings 110 and 120.

A front surface of the portable terminal 100 corresponds to the first side of the portable terminal 100. That is, when the first and second housings 110 and 120 contact each other, the first area A1 of the flexible display 130 is exposed on the first side of the portable terminal 100.

The first and second housings 110 and 120 may be rotated on the first and second hinge axles 142 and 143 to be unfolded. For instance, the portable terminal 100 may be unfolded by respectively rotating on the first and second hinge axles 142 and 143. In this case, the first and second driving axles 10 and 20 may be rotated. Thus, the areas of the flexible display 130, which are disposed at the both sides of the first area A1, may be presented to the outside of the first and second housings 110 and 120.

An elastic body may be disposed inside the first and second driving axles 10 and 20. When the first and second housings 110 and 120 are folded by the first and second hinge axles 142 and 143, the flexible display 130 is rolled around the first and second driving axles 10 and 20 by an elastic restoring force of the elastic body.

Accordingly, when the first and second housings 110 and 120 are folded by the first and second hinge axles 142 and 143, the flexible display 130 may enter the first and second housings 110 and 120 through the sides of the first and second housings 110 and 120.

The second housing 120 includes a recess G recessed downward from an outer surface of the second housing 120. The recess G of the second housing 120 has the same shape as that of the support member 150, when viewed in a plan view. The support member 150 is inserted into the recess G of the second housing 120.

The recess G has a depth the same as a thickness of the support member 150. Therefore, the upper surface of the support member 150 may be at the same level as that of the upper surface of the second housing 120. One side of the support member 150 is disposed adjacent to the first side of the second housing 120.

A rotation axle 30 is disposed at the one side of the support member 150. The support member 150 may rotate on the rotation axle 30. For instance, the support member 150 may rotate on the rotation axle 30 at an angle. Thus, the support member 150 may be protruded to the outside of the second housing 120 or retracted back into the recess G of the second housing 120.

The first housing 110 may include a driver connected to the first driving axle 10. That is, the driver may be disposed inside the second housing 120 and connected to the second driving axle 20. The driver applies driving signals to the flexible display 130. The pixels of the flexible display 130 display the image in response to the driving signals provided from the driver.

Figure 3:
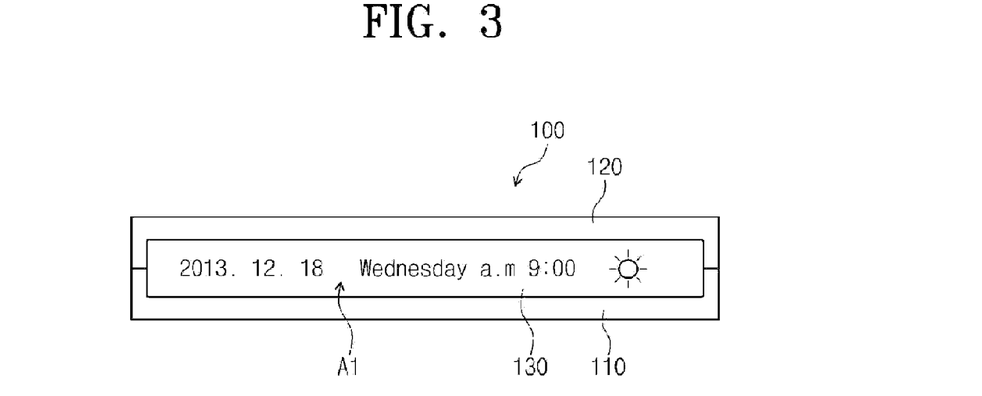
FIG. 3 is a view showing a front side of the portable terminal shown in FIG. 1.

FIG. 3 is a view showing a front side of the portable terminal shown in FIG. 1.

Referring to FIG. 3, when the first and second housings 110 and 120 are folded contacting each other, the first area A1 of the flexible display 130 is exposed on the first side of the portable terminal 100.

When the first and second housings 110 and 120 contact each other, the driver applies the driving signals to the pixels in the first area A1. The pixels display the image in the first area A1 in response to the driving signals. That is, when the angle between the first and second housings 110 and 120 is zero (0), the image is displayed in the first area A1.

The portable terminal 100 may provide the user with a message through the first area A1. As shown in FIG. 3, the message displayed in the first area A1 of the flexible display 130 may include information such as year, date, day of the week, time, weather, etc.

FIGS. 4, 5, 6, 7, 8, and 9 are views showing the portable terminal 100 unfolded with various angles between the first and second housings 110 and 120 according to exemplary embodiments of the present disclosure.

Figure 4:
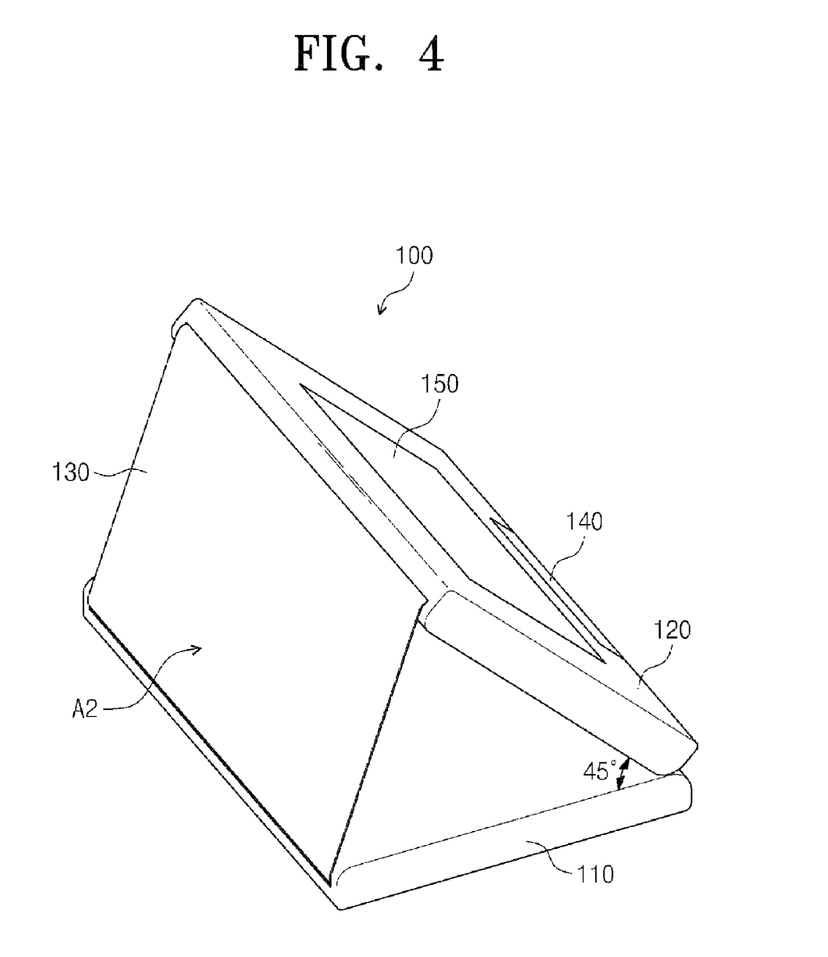
FIGS. 4, 5, 6, 7, 8, and 9 are views showing a portable terminal unfolded with various angles between the first and second housings, according to exemplary embodiments of the present disclosure.

Referring to FIG. 4, the first and second housings 110 and 120 are rotated respectively on the first and second hinge axles 142 and 143 and unfolded with an angle of about 45 degrees in between. The angle between the first housing 110 and the second housing 120 corresponds to an angle between the first and second housings 110 and 120.

In this case, the areas of the flexible display 130 disposed at both sides of the first area A1 may be presented to the outside of the first and second housings 110 and 120 by the rotation of the first and second driving axles 10 and 20. A second area A2 of the flexible display 130 is exposed to the outside of the first and second housings 110 and 120.

The second area A2 is larger than the first area A1. The second area A2 may include the first area A1. When the first and second housings 110 and 120 are unfolded at the angle of about 45 degrees, the driver applies the driving signals to pixels disposed in the second area A2 to display the image in the second area A2. The pixels display the image in the second area A2 in response to the driving signals. Accordingly, the image may be displayed in the second area A2.

The first and second housings 110 and 120 may be maintained unfolded at an angle. The first and second hinge axles 142 and 143 may have a frictional force greater than the elastic restoring force of the first and second driving axles 10 and 20.

When the first and second housings 110 and 120 are unfolded at an angle, the first and second housings 110 and 120 may be maintained unfolded against the elastic restoring force of the first and second driving axles 10 and 20, since the frictional force of the first and second hinge axles 142 and 143 is greater than the elastic restoring force of the first and second driving axles 10 and 20.

For instance, as shown in FIG. 4, the first and second housings 110 and 120 may stay unfolded after being unfolded at the angle of about 45 degrees. When the first and second housings 110 and 120 are unfolded at the angle of about 45 degrees, the frictional force of the first and second hinge axles 142 and 143 is greater than the elastic restoring force of the first and second driving axles 10 and 20. Therefore, the first and second housings 110 and 120 are maintained unfolded after being unfolded at the angle of about 45 degrees.

As an exemplary embodiment, the first and second housings 110 and 120 unfolded at the angle of about 45 degrees have been shown in FIG. 4, but other angles are possible. That is, the first and second housings 110 and 120 may be maintained unfolded after being unfolded at any angle in between.

For instance, the first and second housings 110 and 120 may be unfolded at angles from about 45 degrees to about 180 degrees, or at angles equal to or smaller than about 45 degrees. Since the frictional force of the first and second hinge axles 142 and 143 is greater than the elastic restoring force of the first and second driving axles 10 and 20, the first and second housings 110 and 120 may be maintained unfolded in any angle in between.

When a force greater than the frictional force of the first and second hinge axles 142 and 143 is applied to the first and second housings 110 and 120 by the user, the first and second housings 110 and 120 may respectively rotate on the first and second hinge axles 142 and 143, and the portable terminal may be folded.

Thus, the flexible display 130, except for the first area A1, may be rolled onto the first and second driving axles 10 and 20 by the elastic restoring force of the elastic body disposed in the first and second driving axles 10 and 20. When the first and second housings 110 and 120 are folded to make contact with each other, the image is displayed in the first area A1 as shown in FIG. 3.

Figure 5:
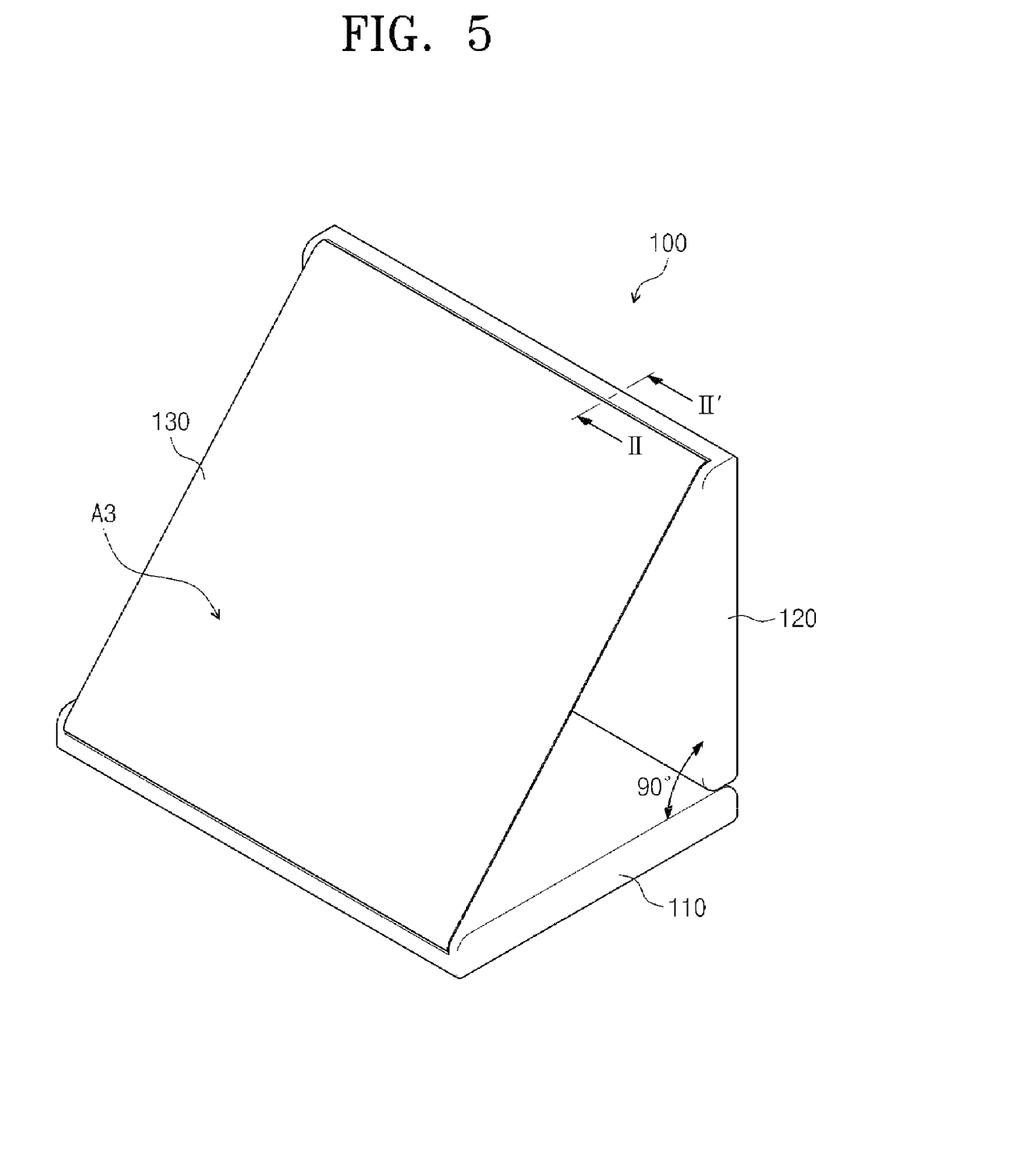

Referring to FIG. 5, the first and second housings 110 and 120 are rotated respectively on the first and second hinge axles 142 and 143 and unfolded with an angle of about 90 degrees in between. In this case, the areas of the flexible display 130 disposed at both sides of the first area A1 may be presented to the outside of the first and second housings 110 and 120 by the rotation of the first and second driving axles 10 and 20. A third area A3 of the flexible display 130 is exposed to the outside of the first and second housings 110 and 120.

The third area A3 is larger than the second area A2. The third area A3 may include the second area A2. When the first and second housings 110 and 120 are unfolded at the angle of about 90 degrees, the driver applies the driving signals to the pixels disposed in the third area A3 to display the image in the third area A3. The pixels display the image in the third area A3 in response to the driving signals. Accordingly, the image may be displayed in the third area A3.

As described above, the first and second housings 110 and 120 may be maintained unfolded since the frictional force of the first and second hinge axles 142 and 143 is greater than the elastic restoring force of the first and second driving axles 10 and 20.

When the force greater than the frictional force of the first and second hinge axles 142 and 143 is applied to the first and second housings 110 and 120 by the user, the first and second housings 110 and 120 may respectively rotate on the first and second hinge axles 142 and 143, and the portable terminal may be folded.

The first and second housings 110 and 120 may be folded back to the angle of about 45 degrees as illustrated in FIG. 4. When the first and second housings 110 and 120 are folded at the angle of about 45 degrees, the image may be displayed in the second area A2 as described above with reference to FIG. 4.

Figure 6:
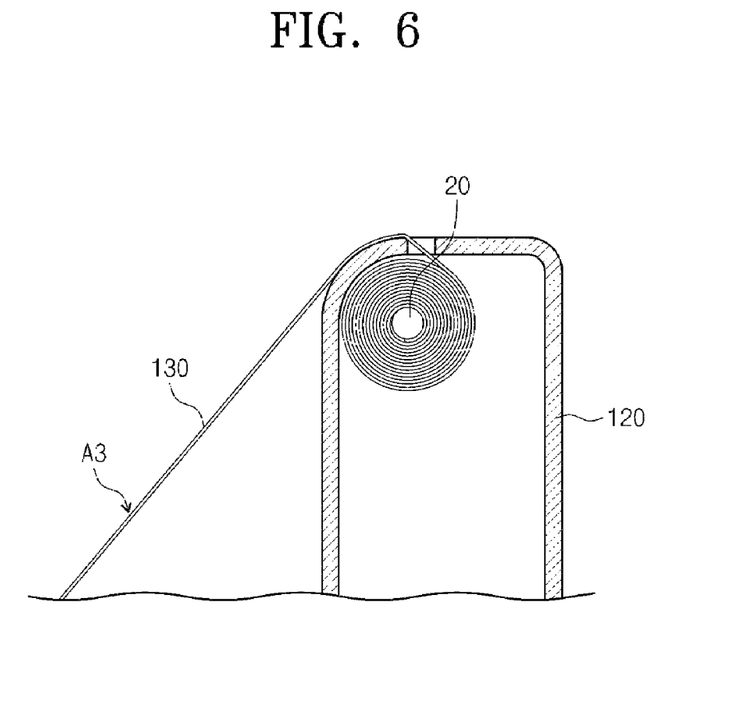

FIG. 6 is a cross-sectional view taken along a line II-II' shown in FIG. 5.

Referring to FIG. 6, an edge between the first side surface of the second housing 120 and a lower surface of the second housing 120 facing the upper surface of the first housing 110, may have a curved surface.

If the edge between the first side surface and the lower surface of the second housing 120 has a right angle shape, the edge may cause defects in the flexible display 130 from the contact. Accordingly, the edge between the first side surface and the lower surface of the second housing 120 has the curved shape, and damage to the flexible display 130 may be decreased.

Similarly, an edge between the first side surface of the first housing 110 and a upper surface of the first housing 110 facing the lower surface of the second housing 120, may also have a curved surface to decrease the damage to the flexible display 130.

Figure 7:
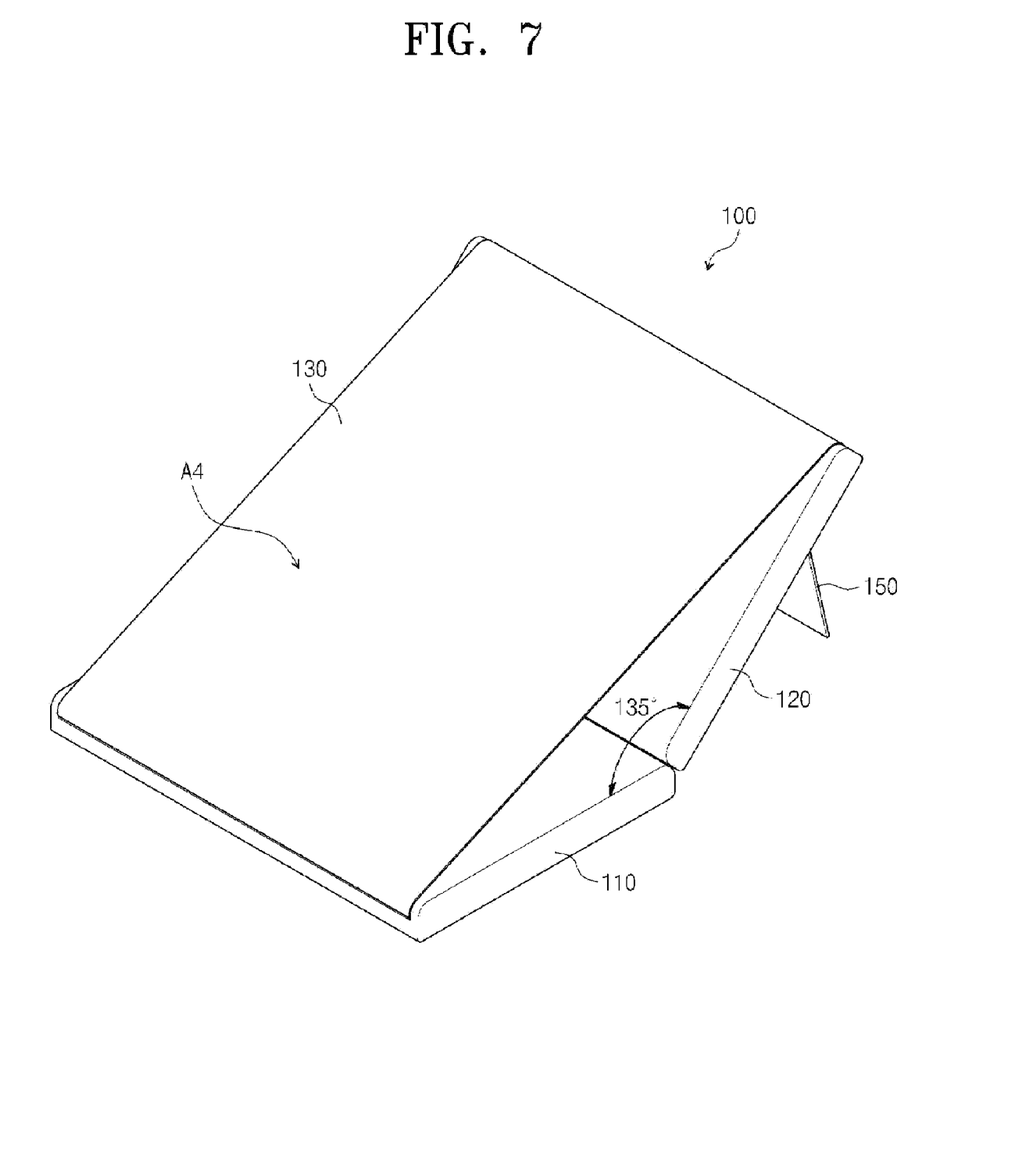

Referring to FIG. 7, the first and second housings 110 and 120 are rotated respectively on the first and second hinge axles 142 and 143 and unfolded with an angle of about 135 degrees in between. In this case, the areas of the flexible display 130 disposed at both sides of the first area A1 may be presented to the outside of the first and second housings 110 and 120 by the rotation of the first and second driving axles 10 and 20. A fourth area A4 of the flexible display 130 is exposed to the outside of the first and second housings 110 and 120.

The fourth area A4 is larger than that of the third area A3. The fourth area A4 may include the third area A3. When the first and second housings 110 and 120 are unfolded at the angle of about 135 degrees, the driver applies the driving signals to the pixels disposed in the fourth area A4 to display the image in the fourth area A4. The pixels display the image in the fourth area A4 in response to the driving signals. Accordingly, the image may be displayed in the fourth area A4.

As described above, the first and second housings 110 and 120 may be maintained unfolded since the frictional force of the first and second hinge axles 142 and 143 is greater than the elastic restoring force of the first and second driving axles 10 and 20.

When the force greater than the frictional force of the first and second hinge axles 142 and 143 is applied to the first and second housings 110 and 120 by the user, the first and second housings 110 and 120 may respectively rotate on the first and second hinge axles 142 and 143, and the portable terminal may be folded.

The first and second housings 110 and 120 may be folded back to the angle of about 45 degrees as illustrated in FIG. 4 or about 90 degrees as illustrated in FIG. 5. When the first and second housings 110 and 120 are folded at the angle of about 45 degrees or about 90 degrees, the image may be displayed in the second area A2 or in the third area A3 as described with reference to FIGS. 4 and 5.

Figure 8:
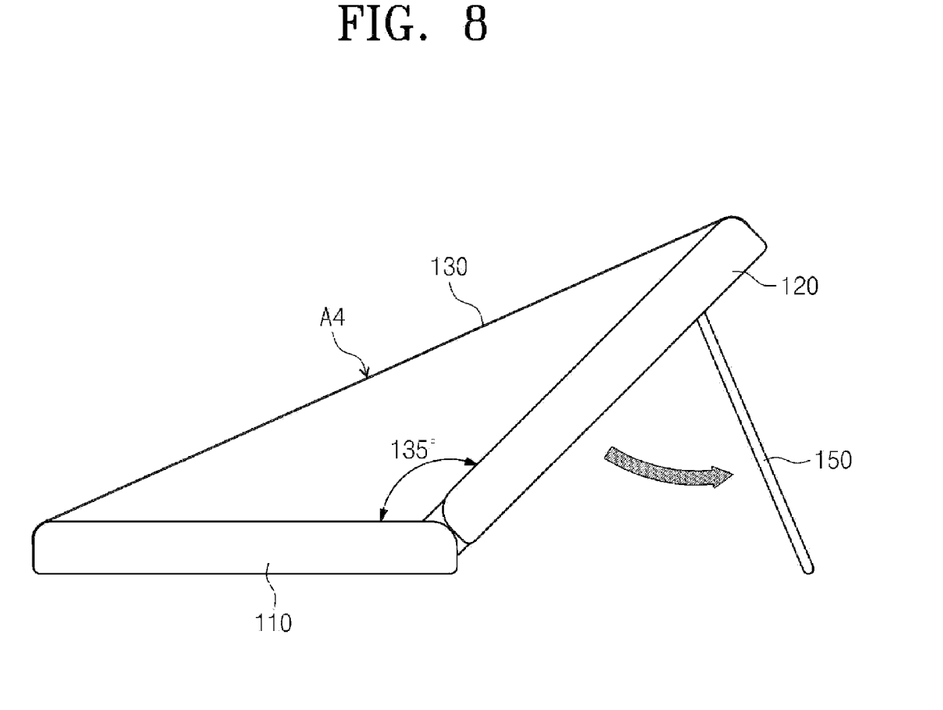

Referring to FIG. 8, the support member 150 may be out of the second housing 120. In detail, when the support member 150 is rotated on the rotation member 30, the support member 150 may be protruded out of the second housing 120 and contact a support surface and support the second housing 120.

When the first and second housings 110 and 120 are unfolded with an angle greater than about 90 degrees, while a lower surface of the first housing 110 is contacting a support surface and the support member 150 is not contacting the support surface, the portable terminal 100 may be unstable.

According to the present exemplary embodiment, when the support member 150 is contacting the support surface as shown in FIG. 8, the support member 150 may support the second housing 120. Therefore, the portable terminal 100 may be supported by the support member 150 and have increased stability.

Figure 9:
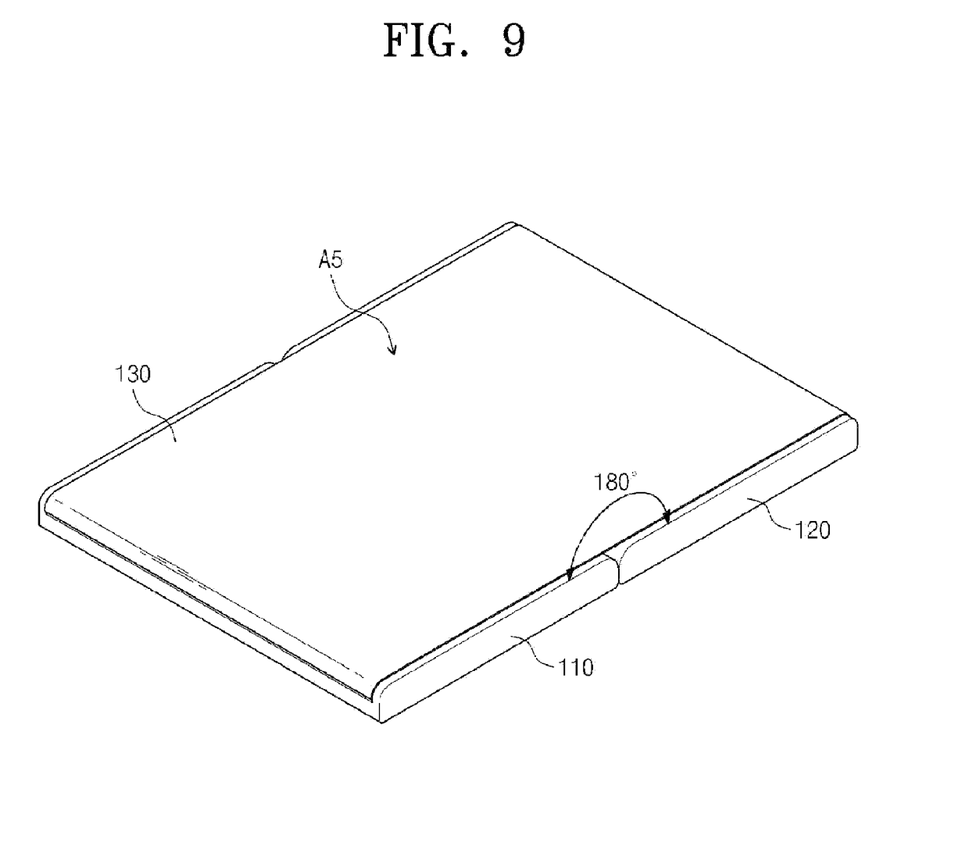

Referring to FIG. 9, the first and second housings 110 and 120 are rotated respectively on the first and second hinge axles 142 and 143 and unfolded with an angle of about 180 degrees in between. In this case, the areas of the flexible display 130 disposed at both sides of the first area A1 may be presented to the outside of the first and second housings 110 and 120 by the rotation of the first and second driving axles 10 and 20. A fifth area A5 of the flexible display 130 is exposed to the outside of the first and second housings 110 and 120.

The fifth area A5 is larger than the fourth area A4. The fifth area A5 may include the fourth area A4. When the first and second housings 110 and 120 are unfolded at the angle of about 180 degrees, the driver applies the driving signals to the pixels disposed in the fifth area A5 to display the image in the fifth area A5. The pixels display the image in the fifth area A5 in response to the driving signals. Accordingly, the image may be displayed in the fifth area A5.

As described above, the first and second housings 110 and 120 may be maintained unfolded since the frictional force of the first and second hinge axles 142 and 143 is greater than the elastic restoring force of the first and second driving axles 10 and 20.

The first and second housings 110 and 120 may be folded back to the angle of about 45 degrees as illustrated in FIG. 4, about 90 degrees as illustrated in FIG. 5, or about 135 degrees as illustrated in FIG. 7. When the first and second housings 110 and 120 are folded at the angle of about 45 degrees, about 90 degrees, or about 135 degrees, the image may be displayed in the second area A2, in the third area A3, or in the fourth area A4 as described with reference to FIGS. 4, 5, and 7.

As an exemplary embodiment, the portable terminal 100 unfolded at the angles of about 45, about 90, about 135, and about 180 degrees have been described, but they should not be limited thereto or thereby. That is, embodiments of present invention are not limited to angles illustrated in FIGS. 4, 5, 6, 7, 8, and 9, and the portable terminal 100 may be unfolded at any angle between about 180 degrees and zero degrees. The flexible display 130 may be exposed corresponding to the angle between the first and second housings 110 and 120. That is, an exposed portion of the flexible display 130 may be proportional to the angle between the first and second housings 110 and 120. As described above, since the image is displayed in the exposed portion of the flexible display 130, various sized images may be displayed. Consequently, the portable terminal 100 may be folded or unfolded at various angles to display the images of various sizes.

The exposed flexible display 130 may also include a touch input scheme. The flexible display 130 may include the touch input scheme, e.g. a keypad input system, and the flexible display 130 may display the image corresponding to an input signal input by the user through the touch input system scheme. The portable terminal 100 according to the present disclosure may be applied to various portable terminals, such as a smart phone, a tablet personal computer, etc.

The portable terminal 100 according to the present disclosure may provide various sized images to the user. Additionally, since the portable terminal 100 may have the foldable structure and may be unfolded at the angle of about 180 degrees, a relatively large screen may be provided to the user compared to a conventional portable terminal.

Figure 10:
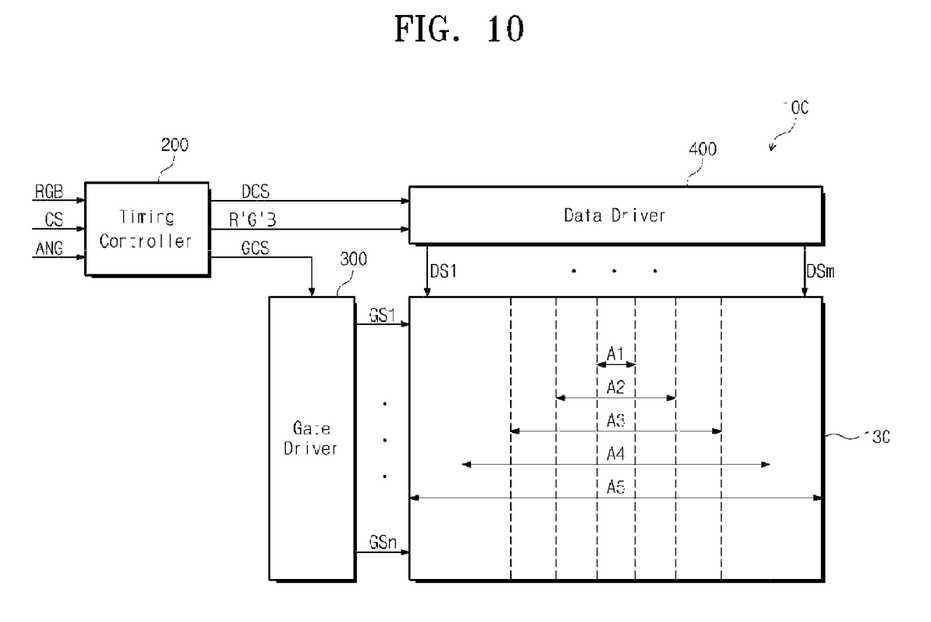
FIG. 10 is a block diagram illustrating elements of a portable terminal that drive a flexible display, according to an exemplary embodiment of the present disclosure.

FIG. 10 is a block diagram illustrating elements of the portable terminal 100 that drive the flexible display 130, according to exemplary embodiments of the present disclosure.

Referring to FIG. 10, the portable terminal 100 includes a timing controller 200, a gate driver 300, and a data driver 400 to drive the flexible display 130. Although not shown in figures, the flexible display 130 includes the pixels arranged in a matrix form.

For mere explanation purpose, FIG. 10 shows the first to fifth areas A1 to A5 of the flexible display 130 that may be respectively exposed through the flexible display 130 when the first and second housings 110 and 120 are unfolded with the angles of about 0, about 45, about 90, about 135, and about 180 degrees. The particular area of the flexible display 130 exposed outside of the portable terminal 100 may be referred to as a display area.

The timing controller 200 receives angle information ANG representing the angle between the first and second housings 110 and 120, and outputs image signals to be displayed in the area of the flexible display 130 corresponding to the angle information. The gate driver 300 and the data driver 400 may apply the driving signals to the pixels in response to the image signals to drive the pixels.

More specifically, the timing controller 200 receives image signals RGB, a control signal CS, and the angle information ANG representing the angle between the first and second housings 110 and 120, from an external device, e.g., a system board. The timing controller 200 converts a data format of the image signals RGB to a data format appropriate for an interface between the data driver 400 and the timing controller 200. The timing controller 200 applies the converted image signals R'G'B' to the data driver 400. The timing controller 200 applies the image signals R'G'B', to be displayed in the area of the flexible display 130 corresponding to the angle information ANG, to the data driver 400 in response to the angle information ANG.

For instance, when the angle between the first and second housings 110 and 120 is about 0 degree, the timing controller 200 applies the image signals R'G'B' displayed in the first area A1 of the flexible display 130 in response to the angle information ANG. When the angle between the first and second housings 110 and 120 is about 45 degrees, the timing controller 200 applies the image signals R'G'B' displayed in the second area A2 of the flexible display 130 in response to the angle information ANG. Similarly, when the angles between the first and second housings 110 and 120 are about 90, about 135, and about 180 degrees, the timing controller 200 applies the image signals R'G'B' displayed in the third, fourth, and fifth areas A3, A4, and A5 of the flexible display 130 in response to the angle information ANG.

The timing controller 200 generates a gate control signal GCS and a data control signal DCS in response to the control signal CS from the external device. The gate control signal GCS is used to control an operation timing of the gate driver 300. The timing controller 200 applies the gate control signal GCS to the gate driver 300. The data control signal DCS is used to control an operation timing of the data driver 400. The timing controller 200 applies the data control signal DCS to the data driver 400.

The gate driver 300 outputs gate signals GS1 to GSn in response to the gate control signal GCS. The gate signals GS1 to GSn are sequentially applied to the pixels arranged in the unit of row. Herein, "n" is an integer greater than zero (0).

The data driver 400 converts the image signals R'G'B' to data signals DS1 to DSm (or data voltages) in response to the data control signal DCS. Herein, "m" is an integer greater than zero (0). The pixels receive the data signals in response to the gate signals. The pixels display gray scales corresponding to the data signals to display the image.

As described above, the timing controller 200 applies the image signals R'G'B' displayed in the area of the flexible display 130 corresponding to the angle information ANG to the data driver 400. Accordingly, the data driver 400 applies the data signals DS1 to DSm to the area of the flexible display 130 corresponding to the angle information ANG.

For instance, when the first and second housings 110 and 120 are unfolded at the angle of about 0 degrees, the data driver 400 converts the image signals R'G'B' to be displayed in the first area A1 and outputs corresponding data signals DS1 to DSm. When the first and second housings 110 and 120 are unfolded at the angle of about 45 degrees, the data driver 400 converts the image signals R'G'B' to be displayed in the second area A2 and outputs corresponding data signals DS1 and DSm. When the first and second housings 110 and 120 are unfolded at the angles of about 90, about 135, and about 180 degrees, the data driver 400 converts the image signals R'G'B' to be displayed in the third, fourth, and fifth areas A3, A4, and A5 and outputs corresponding data signals DS1 and DSm. Consequently, the portable terminal 100 may be folded or unfolded at various angles to display the images with various sizes.

Figure 11:
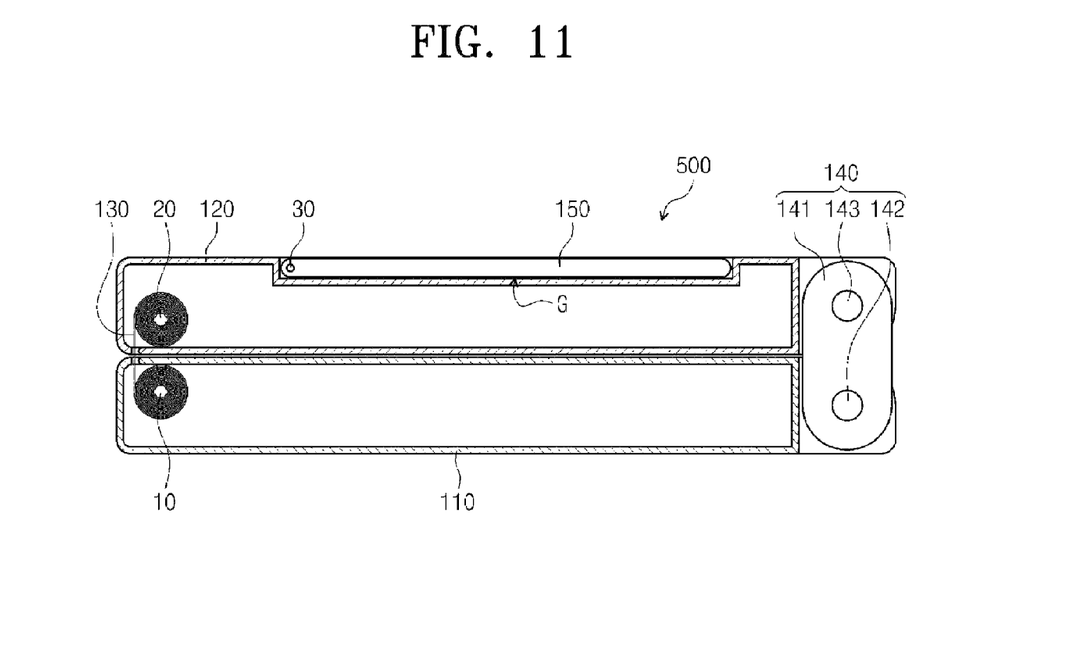
FIGS. 11 and 12 are cross-sectional views illustrating portable terminals according to exemplary embodiments of the present disclosure.
Figure 12:
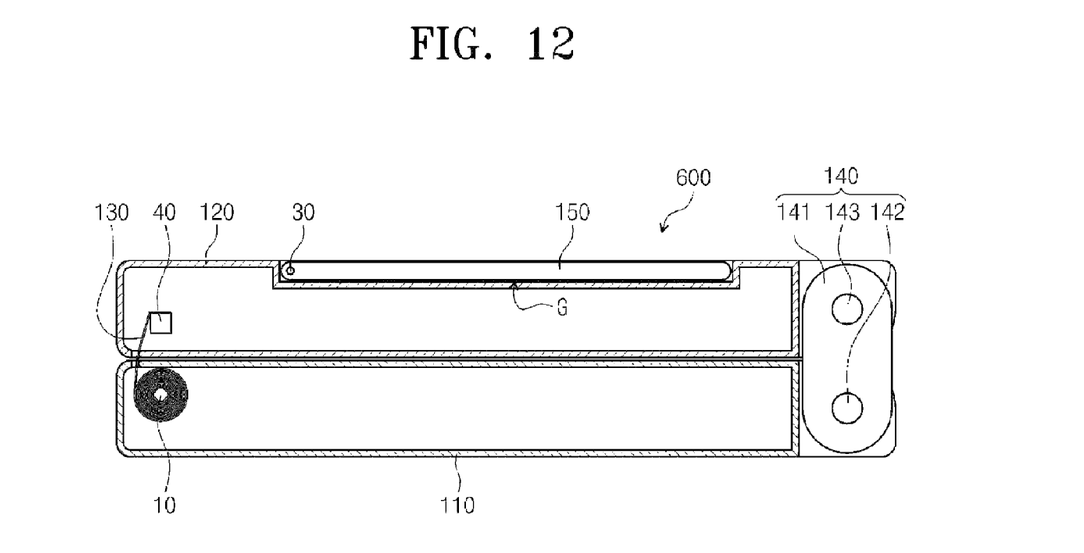

FIGS. 11 and 12 are cross-sectional views illustrating portable terminals 500 and 600, according to exemplary embodiments of the present disclosure.

The portable terminals 500 and 600 shown in FIGS. 11 and 12 have similar structure as the portable terminal 100 shown in FIG. 1, except for the arrangement of the flexible display 130. Therefore, the following descriptions will be focused on the arrangement of flexible display 130.

Referring to FIG. 11, the flexible display 130 is rolled onto the first and second driving axles 10 and 20 disposed at the first side in the first and second housings 110 and 120. When the first and second housings 110 and 120 are folded contacting each other, the flexible display 130 is not exposed to the outside of the first and second housings 110 and 120.

When the first and second housings 110 and 120 are rotated respectively on the first and second hinge axles 142 and 143 and unfolded at an angle, an area of the flexible display 130 corresponding to the angle between the first and second housings 110 and 120 is exposed to the outside of the first and second housings 110 and 120. The image is displayed in the exposed area of the flexible display 130.

Referring to FIG. 12, the first driving axle 10 is disposed in the first housing 110 at the first side, and a fixing axle 40 is disposed in the second housing 120 at the first side. One end of the flexible display 130 is connected to the fixing axle 40 of the second housing 120. The other area of the flexible display 130 is rolled onto the first driving axle 10 of the first housing 110. When the first and second housings 110 and 120 are folded contacting each other, the flexible display 130 is not exposed to the outside of the first and second housings 110 and 120.

When the first and second housings 110 and 120 are rotated respectively on the first and second hinge axles 142 and 143 and unfolded at an angle, an area of the flexible display 130 corresponding to the angle between the first and second housings 110 and 120 is exposed to the outside of the first and second housings 110 and 120. The image is displayed in the exposed area of the flexible display 130.

Consequently, the portable terminals 500 and 600 may be folded or unfolded at various angles to display the images with various sizes.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Thus, it is intended that the present invention cover the modifications and variations of this invention provided they come within the scope of the appended claims and their equivalents.

What is claimed is:

1. A portable terminal, comprising:
    a first housing comprising opposing first and second sides;
    a second housing comprising opposing first and second sides;
    a hinge connecting the first sides of the first and second housings;
    a flexible display comprising a first end disposed in the second side of the first housing, a second end disposed in the second side of the second housing; and
    a driver configured to drive the flexible display,
    wherein the first housing and the second housing are configured to rotate on the hinge to form an angle therebetween such that a corresponding portion of the flexible display is exposed,
    wherein, when the angle between the first and second housings is zero (0) degrees, a center portion of the flexible display is disposed on at least a portion of outer surfaces of the second sides of the first and second housings, and
    wherein the driver is configured to output driving signals corresponding to the angle to the flexible display, such an image is displayed on the exposed portion of the flexible display.

2. The portable terminal of claim 1, wherein the driver is configured to output driving signals corresponding to a year, date, day of the week, time, and weather, when the angle between the first and second housings is zero (0) degrees.

3. The portable terminal of claim 1, further comprising:
    a first driving axle disposed in the second side of the first housing and connected to the first end of the flexible display; and
    a second driving axle disposed in the second side of the second housing and connected to the second end of the flexible display.

4. The portable terminal of claim 3, wherein the first driving axle and the second driving axle are configured to rotate in first and second directions, to thereby wind and unwind the flexible display.

5. The portable terminal of claim 3, wherein each of the first driving axle and the second driving axle comprises an elastic body to bias the rotations thereof in one of the first or second directions.

6. The portable terminal of claim 5, wherein the hinge comprises:
    a first hinge axle connected to the first housing;
    a second hinge axle connected to the second housing; and
    a hinge body connecting the first and second hinge axles, wherein the first and second housings are configured to respectively rotate on the first hinge axle and the second hinge axle.

7. The portable terminal of claim 6, wherein the first hinge axle and the second hinge axle are configured to have frictional forces greater than the biasing forces of the elastic bodies.

8. The portable terminal of claim 1, further comprising:
    a recess formed in an outer surface of the second housing;
    a support member disposed in the recess; and
    a rotation member connecting a first side of the support member to the recess, wherein the support member is configured to rotate on the rotation member to be selectively extended from the second housing.

9. The portable terminal of claim 8, wherein the first side of the support member is disposed adjacent to the second side of the second housing.

10. The portable terminal of claim 9, wherein the support member is configured to rotate on the rotation member and configured to protrude out to support the second housing when the angle between the first and second housings is greater than about 90 degrees.

11. The portable terminal of claim 1, wherein edges of the second sides of first and second housings that contact the flexible display are curved, to reduce bending of the flexible display.

12. The portable terminal of claim 1, further comprising a timing controller configured to receive an angle information corresponding to the angle between the first and second housings and output corresponding image signals to the driver, wherein the driver is configured to generate the driving signals in response to the image signals.

* * * * *